(12) United States Patent
Xue et al.

(10) Patent No.: US 12,027,183 B2
(45) Date of Patent: Jul. 2, 2024

(54) VIDEO PROCESSING METHOD AND APPARATUS, AND ELECTRONIC DEVICE AND STORAGE MEDIUM

(71) Applicant: Beijing Zitiao Network Technology Co., Ltd., Beijing (CN)

(72) Inventors: Rufeng Xue, Beijing (CN); Xufeng Ling, Beijing (CN); Hao Fu, Beijing (CN); Jinchao Wu, Beijing (CN); Hongyun Mao, Beijing (CN); Shichao Gao, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/468,508

(22) Filed: Sep. 15, 2023

(65) Prior Publication Data
US 2024/0005961 A1 Jan. 4, 2024

Related U.S. Application Data

(63) Continuation of application No. PCT/CN2022/080276, filed on Mar. 11, 2022.

(30) Foreign Application Priority Data

Mar. 15, 2021 (CN) .......................... 202110278694.5

(51) Int. Cl.
*G11B 27/031* (2006.01)
(52) U.S. Cl.
CPC .................................. *G11B 27/031* (2013.01)
(58) Field of Classification Search
CPC .................................................... G11B 27/031
See application file for complete search history.

(56) References Cited

U.S. PATENT DOCUMENTS

| 8,805,164 B2 * | 8/2014 | Shore | G11B 27/02 386/281 |
|---|---|---|---|
| 10,721,514 B2 * | 7/2020 | Louis | G06F 16/78 |

(Continued)

FOREIGN PATENT DOCUMENTS

| CN | 106973304 A | 7/2017 |
| CN | 108924647 A | 11/2018 |

(Continued)

OTHER PUBLICATIONS

International Search Report in PCT/CN2022/080276, dated May 23, 2022, 5 pages.

(Continued)

*Primary Examiner* — Mishawn N. Hunter
(74) *Attorney, Agent, or Firm* — Astute IP Law Group

(57) ABSTRACT

Provided are a video processing method, a video processing apparatus, an electronic device, and a storage medium. The method includes: displaying a first editing interface of a first target video, and acquiring first editing information of performing, in the first editing interface, a first editing operation on the first target video by a user, where the first target video is stored in cloud end; receiving a first triggering operation on a switching control in the first editing interface; displaying a posting interface in response to the first triggering operation; receiving a second triggering operation on a posting control in the posting interface; and sending the first editing information to the cloud end in response to the second triggering operation to synthesize the first target video into a second target video in the cloud end according to the first editing information and to post the second target video.

20 Claims, 8 Drawing Sheets

(56) References Cited

U.S. PATENT DOCUMENTS

| | | | |
|---|---|---|---|
| 2015/0117839 A1* | 4/2015 | Oberbrunner | H04N 21/237 |
| | | | 386/280 |
| 2015/0139615 A1 | 5/2015 | Hill | |
| 2019/0208289 A1* | 7/2019 | Singh | H04N 21/8547 |
| 2020/0312371 A1 | 10/2020 | Raju et al. | |

FOREIGN PATENT DOCUMENTS

| | | | |
|---|---|---|---|
| CN | 109040770 A | 12/2018 | |
| CN | 109068148 A | 12/2018 | |
| CN | 109194887 A | 1/2019 | |
| CN | 109889882 A | 6/2019 | |
| CN | 112261416 A | 1/2021 | |
| CN | 113038234 A | 6/2021 | |
| WO | 2007082167 A2 | 7/2007 | |

OTHER PUBLICATIONS

Office Action dated May 7, 2022 in Chinese Application No. 202110278694.5, 7 pages.
Office Action dated Jan. 20, 2023 in Chinese Application No. 202110278694.5, 5 pages.

* cited by examiner

→ # VIDEO PROCESSING METHOD AND APPARATUS, AND ELECTRONIC DEVICE AND STORAGE MEDIUM

CROSS-REFERENCE TO RELATED APPLICATION(S)

This is a continuation of International Patent Application No. PCT/CN2022/080276, filed Mar. 11, 2022, which claims priority to Chinese Patent Application No. 202110278694.5 filed with the China National Intellectual Property Administration (CNIPA) on Mar. 15, 2021, the disclosures of which are incorporated herein by reference in their entireties.

TECHNICAL FIELD

The present disclosure relates to the field of computer technologies, for example, a video processing method, a video processing apparatus, an electronic device, and a storage medium.

BACKGROUND

Users may edit and synthesize videos locally via a video editor and upload the synthesized videos to the cloud end of the video platform for posting.

SUMMARY

The present disclosure provides a video processing method, a video processing apparatus, an electronic device, and a storage medium to simplify operations required to modify uploaded videos and reduce the waiting time of users.

The present disclosure provides a video processing method. The method includes the following steps:

A first editing interface of a first target video is displayed, and first editing information of performing, in the first editing interface, a first editing operation on the first target video by a user is acquired. The first target video is stored in the cloud end.

A first triggering operation on a switching control in the first editing interface is received.

A posting interface is displayed in response to the first triggering operation.

A second triggering operation on a posting control in the posting interface is received.

The first editing information is sent to the cloud end in response to the second triggering operation to synthesize the first target video into a second target video in the cloud end according to the first editing information and to post the second target video.

The present disclosure also provides a video processing apparatus. The apparatus includes a first display module, a first reception module, a second display module, a second reception module, and a video posting module.

The first display module is configured to display a first editing interface of a first target video and acquire the first editing information of performing, in the first editing interface, a first editing operation on the first target video by a user. The first target video is stored in the cloud end.

The first reception module is configured to receive a first triggering operation on a switching control in the first editing interface.

The second display module is configured to display a posting interface in response to the first triggering operation.

The second reception module is configured to receive a second triggering operation on a posting control in the posting interface.

The video posting module is configured to send the first editing information to the cloud end in response to the second triggering operation to synthesize the first target video into a second target video in the cloud end according to the first editing information and to post the second target video.

The present disclosure also provides an electronic device. The electronic device includes one or more processors and a memory.

The memory is configured to store one or more programs.

When executed by the one or more processors, the one or more programs cause the one or more processors to perform the aforementioned video processing method.

The present disclosure also provides a computer-readable storage medium storing a computer program which, when executed by a processor, performs the aforementioned video processing method.

DETAILED DESCRIPTION

Embodiments of the present disclosure are described hereinafter with reference to the drawings. The drawings illustrate some embodiments of the present disclosure, but the present disclosure may be implemented in various manners. These embodiments are provided for an understanding of the present disclosure. The drawings and embodiments of the present disclosure are merely illustrative.

Steps described in method embodiments of the present disclosure may be performed in sequence and/or in parallel. Additionally, the method embodiments may include additional steps and/or omit some of the illustrated steps. The scope of the present disclosure is not limited in this respect.

As used herein, the term "include" and variations thereof are intended to be inclusive, that is, "including, but not limited to". The term "based on" is "at least partially based on". The term "an embodiment" means "at least one embodiment"; the term "another embodiment" means "at least one another embodiment"; the term "some embodiments" means "at least some embodiments". Related definitions of other terms are given in the description hereinafter.

Concepts such as "first" and "second" in the present disclosure are used to distinguish between apparatuses, between modules, or between units and are not intended to limit the order or mutual dependence of the functions performed by these apparatuses, modules, or units.

"One" and "multiple" mentioned in the present disclosure are not limiting but illustrative and should be construed by those skilled in the art as "one or more" unless otherwise specified in the context.

The names of messages or information exchanged between multiple apparatuses in the embodiments of the present disclosure are used for illustrative purposes only and are not used to limit the scope of these messages or information.

In related art, when dissatisfied with videos uploaded to the cloud end of the video platform, users need to firstly modify the videos locally via a video editor, and after the modification is completed, synthesize the modified videos again, upload them to the cloud end of the video platform, and then post the videos to the video platform by a posting operation. However, according to the video posting solutions in the related art, users can only post videos by a posting operation after videos are synthesized and uploaded, and have to wait for a long time, resulting in a poor user experience.

Figure 1:
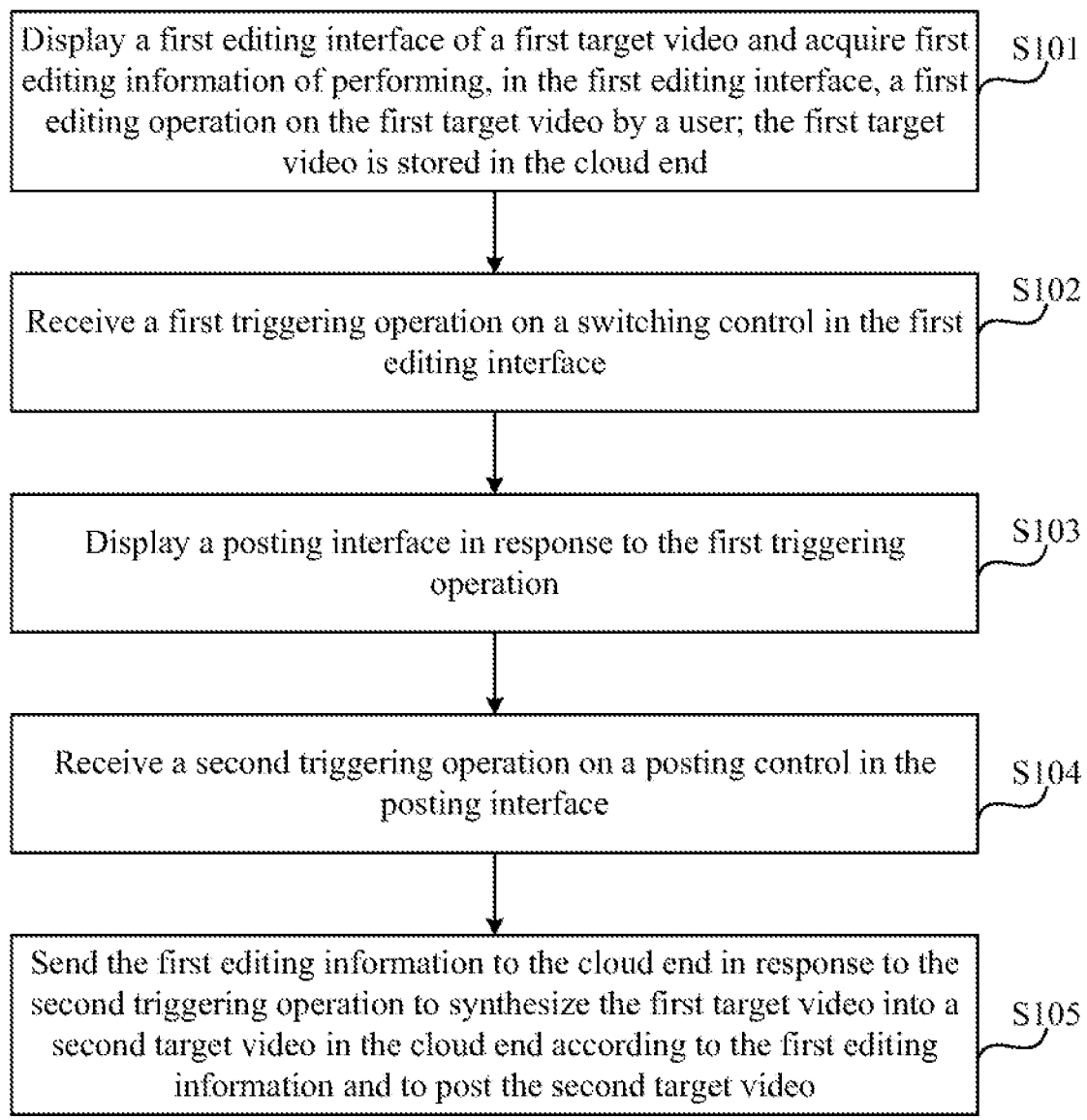
FIG. 1 is a flowchart of a video processing method according to an embodiment of the present disclosure.

FIG. 1 is a flowchart of a video processing method according to an embodiment of the present disclosure. The method may be executed by a video processing apparatus. The apparatus may be implemented by software and/or hardware and may be configured in an electronic device such as a mobile phone or a tablet computer. The video processing method according to embodiments of the present disclosure is applicable to a scenario where editing and posting are to be performed on uploaded videos. As shown in FIG. 1, the video processing method in this embodiment may include the steps S101-S105 described below.

In S101, a first editing interface of a first target video is displayed, and the first editing information of performing, in the first editing interface, a first editing operation on the first target video by a user is acquired; the first target video is stored in the cloud end.

The first target video may be understood as a video uploaded by the user to the cloud end, such as to-be-synthesized video materials or a synthesized video. When the first target video is a synthesized video, the first target video may be a video synthesized by the user locally and uploaded to the cloud end or a video synthesized by the user in the cloud end. The first target video may be a posted or unposted video. Accordingly, the first editing interface may be an editing interface for the user to edit the first target video; the first editing operation may be an editing operation performed by the user on the first target video in the first editing interface; the first editing information may be information of the first editing operation performed by the user in the first editing interface. In other words, the electronic device may, via the first editing interface, acquire the first editing information of the editing operation that the user intends (expects) to perform on the first target video. However, unlike the existing art, the electronic device in this embodiment does not locally edit the first target video (including not synthesizing a second target video locally) according to the first editing information after acquiring the first editing information, but sends the first editing information to the cloud end to edit the first target video in the cloud end (including synthesizing the first target video into a second target video in the cloud end) according to the first editing information.

Figure 2:
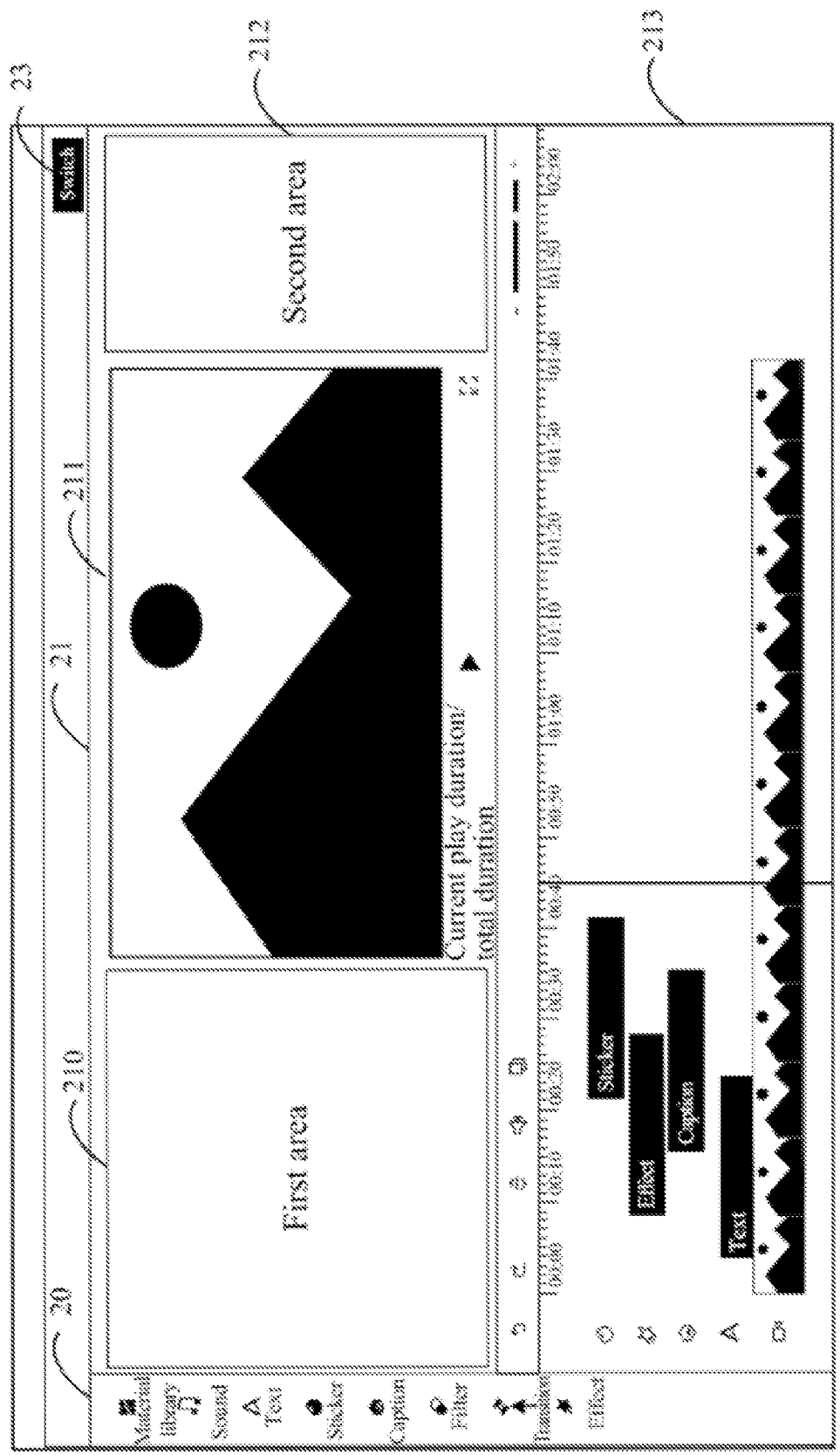
FIG. 2 is a diagram illustrating a first editing interface according to an embodiment of the present disclosure.

FIG. 2 is a diagram illustrating a first editing interface according to this embodiment. As shown in FIG. 2, the first editing interface may be provided with a control area 20 and a main display area 21. The control area 20 may be provided with a material library control, a sound control, a text control, a sticker control, a caption control, a filter control, a transition control, and/or an effect control. The main display area 21 may be provided with a first area 210, a preview area 211, a second area 212, and an edit area 213. Thus, the user may instruct the electronic device to display video materials (such as displaying online video materials provided by operators and/or displaying local video materials imported by the user), sounds, text-styles, stickers, filters, transition-videos, or effects available for user selection in the first area 210 by triggering the material library control, the sound control, the text control, the sticker control, the filter control, the transition control, or, the effect control in the control area 20 and to display editing controls of video materials, sounds, text-styles, stickers, filters, transition-videos, or effects in the second area for the users to perform editing. Alternatively, the user inputs the caption of the video in the first area by triggering the caption control. Alternatively, the user edits the first target video and/or a newly added video material via the edit area 213, such as editing the video by dragging the left border or the right border of the video track. Moreover, the preview effect of the second to-be-synthesized target video may be viewed in the preview area 212.

In this embodiment, after uploading the first target video to the cloud end or posting the first target video, the user may instruct the electronic device to display the first editing interface of the first target video and modify the first target video via the first editing interface when the user is dissatisfied with the uploaded or posted first target video.

Figure 3:
FIG. 3 is a diagram illustrating a posting interface according to an embodiment of the present disclosure.

Illustratively, as shown in FIG. 3, in a case where the first target video is a video the user uploads to the cloud end but have not been posted, when the user intends to modify the first target video, the user may control the electronic device to display the posting interface of the first target video, instruct the electronic device to display a first modification mode selection window 31 by triggering a first video modifying control 30 in the posting interface, and trigger a first online modifying control 310 in the first modification mode selection window; accordingly, the electronic device may switch the current displaying interface from the posting interface of the first target video to the first editing interface of the first target video when detecting that the user triggers the first online modifying control 310, as shown in FIG. 2. Thus, the user may modify the first target video in the first editing interface. Additionally, as shown in FIG. 3, the posting interface of the first target video may also display basic information of the first target video at the time of posting, such as the title, cover, introduction, type, participating activities, and/or content synchronization information of the first target video for the user to view and edit; the first modification mode selection window 31 may also be provided with a first re-uploading control 311 so that the user may re-upload a new first target video by triggering the first re-uploading control 311.

Figure 4:
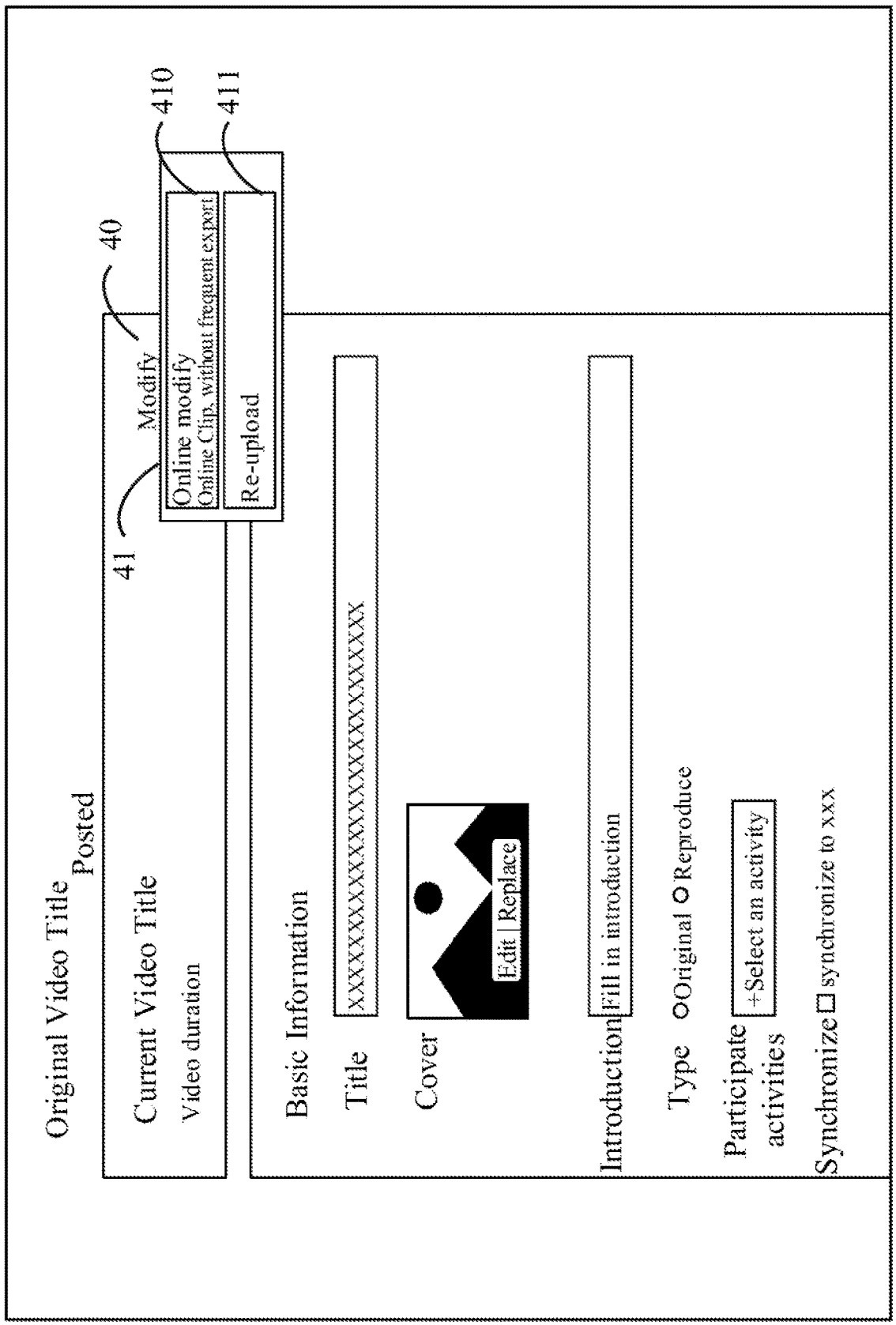
FIG. 4 is a diagram illustrating a posting information interface according to an embodiment of the present disclosure.

As shown in FIG. 4, when the first target video is a video posted by the user, when the user intends to modify the first target video, the user may control the electronic device to display the posting information interface (that is, the posting details interface) of the first target video, instruct the electronic device to display a second modification mode selection window 41 by triggering a second video modifying control 40 in the posting information interface, and trigger a second online modifying control 410 in the second modification mode selection window 41; accordingly, the electronic device may switch the current displaying interface from the posting information interface of the first target video to the first editing interface of the first target video when detecting that the user triggers the second online modifying control 410, as shown in FIG. 2. Thus, the user may modify the first target video in the first editing interface. Additionally, as shown in FIG. 4, the posting information interface of the first target video may also display basic information when the first target video is posted, the original title when the first target video is posted, and the current video title of the first target video; the second modification mode selection window 41 may also be provided with a second re-uploading control 411 so that the user may re-upload a new first target video by triggering the second re-uploading control 411.

In an embodiment, before displaying the first editing interface of the first target video, the method also includes synthesizing to-be-synthesized video materials selected by the user into the first target video. The to-be-synthesized video materials include first to-be-synthesized video materials and/or second to-be-synthesized video materials. The first to-be-synthesized video materials are stored in the cloud end. The second to-be-synthesized video materials are stored locally.

The to-be-synthesized video materials may be understood as user-selected video materials to be synthesized and may include first to-be-synthesized video materials stored in the cloud end and/or second to-be-synthesized video materials stored locally.

In the aforementioned embodiment, the first target video may be a video synthesized by the user. Accordingly, the user may synthesize the first target video based on the video materials stored locally and/or the video materials stored in the cloud end. For example, the user may synthesize the first target video locally and upload the first target video to the cloud end or upload the second to-be-synthesized video materials stored locally to the cloud end and synthesize the first target video in the cloud end based on the uploaded second to-be-synthesized video material and/or the first to-be-synthesized video materials provided by operators, which is not limited in this embodiment.

In S102, a first triggering operation on a switching control in the first editing interface is received.

In S103, a posting interface is displayed in response to the first triggering operation.

The switching control in the first editing interface may be understood as a control configured in the first editing interface for the user to trigger to instruct the electronic device to switch the current displaying interface from the first editing interface to the posting interface. Accordingly, the first triggering operation may be any operation that triggers the switching control in the first editing interface, such as a clicking operation on the switching control in the first editing interface.

The posting interface may be an interface for the user to perform the second triggering operation to instruct the electronic device to synthesize and post the second target video via the cloud end, that is, an interface switched from the first editing interface on the electronic device. When the user triggers the posting control in the posting interface, the electronic device may send the first editing information to the cloud end to request the cloud end to synthesize and post the video.

As shown in FIG. 2, the electronic device displays the first editing interface of the first target video; the user performs an editing operation on the first target video in the first editing interface and triggers a switching control 23 in the first editing interface when the user intends to post the first target video after the editing operation is performed; upon detecting that the user triggers the switching control 23 in the first editing interface, the electronic device determines that the first triggering operation is received and switches the current displaying interface of the first editing interface to the posting interface (similar to the posting interface of the first target video). Therefore, the user can edit the post information such as the basic information at the time of posting the second to-be-synthesized target video in the posting interface and can instruct the electronic device to synthesize and post the second target video in the cloud end by triggering the posting control in the posting interface after the editing is completed.

In S104, a second triggering operation on a posting control in the posting interface is received.

The posting control in the posting interface may be used for the user to trigger an operation to instruct the electronic device to synthesize the first target video into the second target video in the cloud end and post the second target video. The second triggering operation may be an operation that triggers the posting control in the posting interface, such as an operation clicking on the posting control in the posting interface.

In this embodiment, the user may instruct the electronic device to synthesize and post the second target video via the cloud end by triggering the posting control in the posting interface. Illustratively, the electronic device displays a posting interface, and the user may trigger the posting control in the posting interface when intending to post the second target video. Accordingly, the electronic device may determine that the first posting operation for the second target video is received upon detecting that the user triggers the posting control.

In S105, the first editing information is sent to the cloud end in response to the second triggering operation to synthesize the first target video into a second target video in the cloud end according to the first editing information and to post the second target video.

The second target video may be a video obtained by processing of the first target video by the user according to the first editing information of the first target video.

In this embodiment, the user may edit the first target video by cloud editing and acquire the first editing information input by the user via the electronic device (local terminal). In this case, the electronic device may not perform editing and synthesis operations corresponding to the first editing information but send the first editing information to the cloud end for editing and synthesis when receiving the triggering operation of the user triggering the posting control in the posting interface. Therefore, the user can input the editing operation on the first target video and perform the video posting operation without waiting for video synthesis. Additionally, the user can switch interfaces as required after performing the video posting operation without staying on the posting interface for video synthesis and without uploading the synthesized video again. In this manner, operations required for editing and posting the video are simplified, and waiting time of users is reduced, and user experience is improved.

When receiving the second triggering operation on the posting control in the posting interface, the electronic device may firstly send the acquired first editing information of performing, in the first editing interface, the first editing operation on the first target video by the user to the cloud end. Accordingly, after receiving the first editing information sent by the electronic device, the cloud end may synthesize the first target video into a second target video according to the first editing information. For example, the cloud end synthesizes the first target video with a video material, sound, sticker, caption, filter, and/or transition video newly added by the user to obtain the second target video and post the second target video. For example, the cloud end directly posts the second target video to the current video platform or posts the second target video to the current video platform and other video platforms selected by the user.

In the video processing method according to this embodiment, a first editing interface of a first target video stored in the cloud end is displayed; first editing information of performing, in the first editing interface, a first editing operation on the first target video by a user is acquired; a first triggering operation on a switching control in the first editing interface is received; a posting interface is displayed in response to the first triggering operation; a second triggering operation on a posting control in the posting interface is received; the first editing information is sent to the cloud end in response to the second triggering operation to synthesize the first target video into a second target video in the cloud end according to the first editing information and to post the second target video. In this embodiment, the aforementioned technical solution is adopted so that the user is supported to perform cloud editing on the uploaded first target video, and when the operation of the user posting the second target video is received, the first target video is synthesized into the second target video in the cloud end. Thus, the user does not need to download the first target video locally for editing, wait for the synthesis of the second target video, or upload the synthesized second target video again, which simplifies the operation required for the user to modify the video in the cloud end and reduces the waiting time of users.

Figure 5:
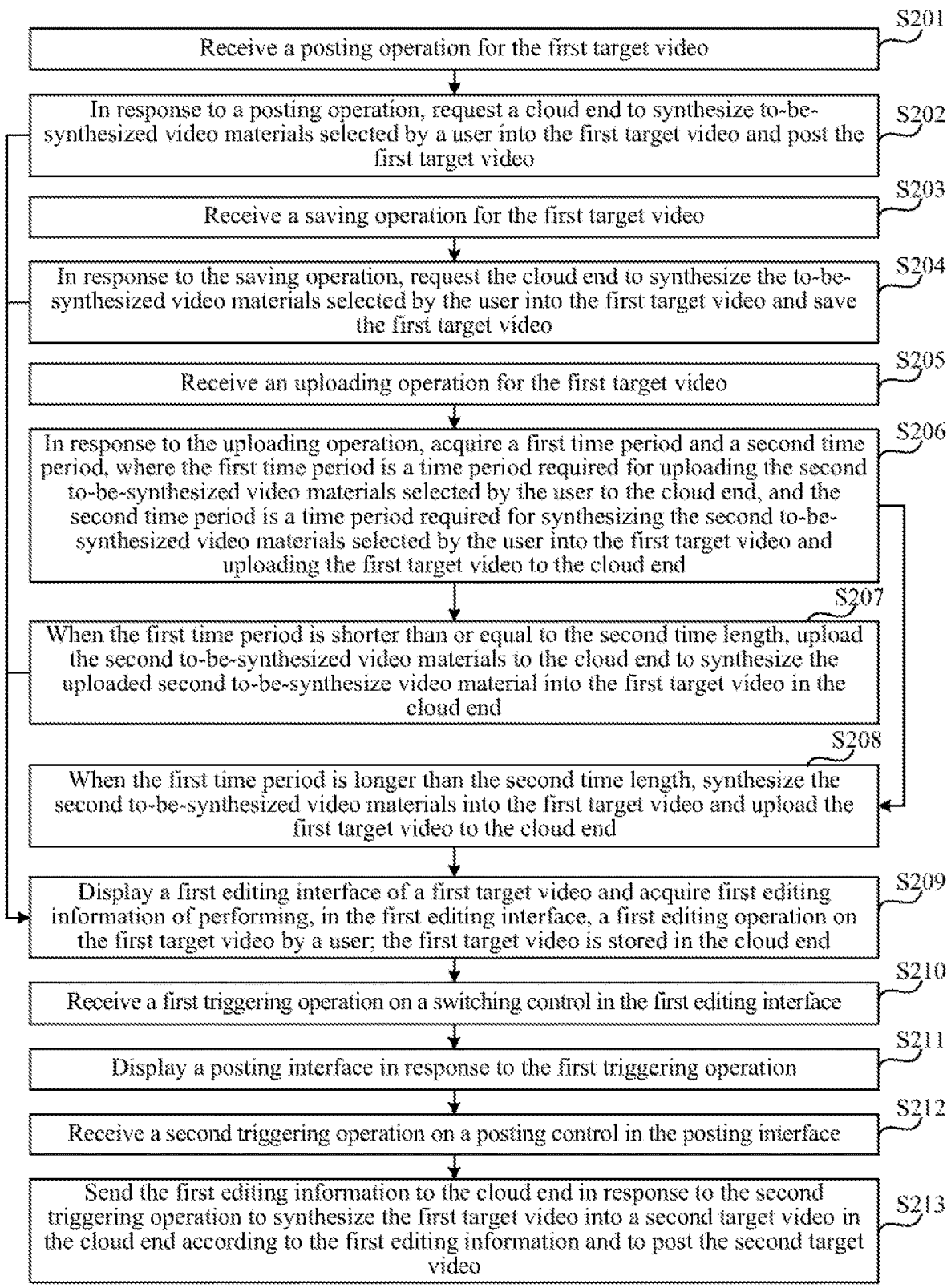
FIG. 5 is another flowchart of a video processing method according to an embodiment of the present disclosure.

FIG. 5 is another flowchart of a video processing method according to an embodiment of the present disclosure. The solutions in this embodiment may be combined with one or more alternative solutions in the aforementioned embodiments. Alternatively, synthesizing the to-be-synthesized video materials selected by the user into the first target video includes the steps described below. A posting operation for the first target video is received; in response to the posting operation, the cloud end is requested to synthesize the to-be-synthesized video materials selected by the user into the first target video and to post the first target video.

Alternatively, synthesizing the to-be-synthesized video materials selected by the user into the first target video includes the steps described below. A saving operation for the first target video is received; in response to the saving operation, the cloud end is requested to synthesize the to-be-synthesized video materials selected by the user into the first target video and to save the first target video.

Alternatively, the to-be-synthesized video materials include the second to-be-synthesized video materials, and synthesizing the to-be-synthesized video materials selected by the user into the first target video includes the steps described below. An uploading operation for the first target video is received; in response to the uploading operation, a first time period required for uploading the second to-be-synthesized video materials selected by the user to the cloud end is acquired, and a second time period required for synthesizing the second to-be-synthesized video materials selected by the user into the first target video and uploading the first target video to the cloud end is acquired; when the first time period is shorter than or equal to the second time period, the second to-be-synthesized video materials is uploaded to the cloud end to synthesize the uploaded second to-be-synthesize video materials into the first target video in the cloud end; and, when the first time period is longer than the second time period, the second to-be-synthesized video materials is synthesized into the first target video, and the first target video is uploaded to the cloud end.

Accordingly, as shown in FIG. 5, the video processing method in this embodiment may include the steps S201-S213 described below.

In S201, a posting operation for the first target video is received.

In S202, in response to a posting operation, the cloud end is requested to synthesize to-be-synthesized video materials selected by a user into the first target video and to post the first target video, and S209 is performed. The to-be-synthesized video materials include first to-be-synthesized video materials and/or second to-be-synthesized video materials; the first to-be-synthesized video materials are stored in the cloud end; the second to-be-synthesized video materials are stored locally.

The posting operation for the first target video may be an operation for posting the first target video, such as a triggering operation on the posting control in the posting interface of the first target video, for example, clicking the posting control in the posting interface of the first target video.

In this embodiment, the electronic device may edit the video material (such as the online video material provided by operators and/or the local video material uploaded to the cloud end by the user) selected by the user online based on the corresponding editing operation of the user and synthesize at least one video material into the first target video and to post the first target video via the cloud end according to the editing information of the user when the user posts the first target video so that the first target video does not need to be uploaded to the cloud end, and the user does not need to wait for the upload of the first target video. Moreover, the posting interface of the first target video is displayed immediately after the user's editing is completed instead of displaying the posting interface of the first target video after at least one to-be-synthesized video material after the user's editing is synthesized into the first target video. In this manner, the user can perform the operation of posting the first target video after editing each to-be-synthesized video material, without waiting for the synthesis of the first target video. Thus, the waiting time of users when a video is made and posted is greatly reduced, and users' enthusiasm for making and posting videos is improved.

When intending to post the first target video after editing each to-be-synthesized video material, the user may instruct the electronic device to display the posting interface of the first target video, as shown in FIG. 3, and trigger the posting control 32 in the posting interface. Accordingly, when detecting that the user triggers the posting control 32 in the posting interface, the electronic device may determine that a posting operation for the first target video is received, and in response to the posting operation, request the cloud end to synthesize at least one to-be-synthesized video material into the first target video and to post the first target video.

In S203, a saving operation for the first target video is received.

In S204, in response to the saving operation, a cloud end is requested to synthesize the to-be-synthesized video materials selected by a user into the first target video and to save the first target video, and S209 is performed.

The saving operation for the first target video may be understood as a triggering operation for synthesizing and saving the first target video in the cloud end, such as clicking the saving control of the first target video. The saving control may be displayed when the user edits each video material but does not post the first target video. For example, the saving control is displayed when the user does not perform the posting operation on the first target video but intends to close the posting interface of the first target video (such as switching the currently displayed posting interface of the first target video to another interface), and/or when the user intends to close the second editing interface of the to-be-synthesized video material.

An example is used where the saving control of the first target video is displayed in the posting interface of the first target video. As shown in FIG. 3, the electronic device displays the posting interface of the first target video. When the user does not intend to post the first target video, the user may trigger a closing control (not shown in FIG. 3) in the posting interface or trigger a switching control (not shown in FIG. 3) in the posting interface for switching to another interface. When detecting that the user triggers the closing control or switching control in the posting interface of the first target video, the electronic device displays a save prompt window to prompt the user to save the first target video, and when detecting that the user clicks the saving control in the save prompt window, the electronic device closes the posting interface of the first target video or switches the posting interface of the first target video to an interface corresponding to the switching control triggered by the user and requests the cloud end to synthesize the to-be-synthesized video materials selected by the user into the first target video and store the first target video; when detecting that the user clicks an unsaved control in the save prompt window, the electronic device directly closes the posting interface of the first target video or switches the posting interface of the first target video to an interface corresponding to the switching control triggered by the user.

It can be understood that the electronic device may also automatically request the cloud end to synthesize at least one to-be-synthesized video material into the first target video and to save the first target video when the user closes the second editing interface of the to-be-synthesized video material, or when the user closes the posting interface of the first target video or switches the posting interface of the first target video to another interface, without the need for the user to save the first target video. Thus, the operations the user needs to perform are simplified.

In S205, an uploading operation for the first target video is received.

In S206, in response to the uploading operation, a first time period and a second time period are acquired, the first time period is a time period required for uploading the second to-be-synthesized video materials selected by the user to the cloud end, and the second time period is a time period required for synthesizing the second to-be-synthesized video materials selected by the user into the first target video and uploading the first target video to the cloud end; and S207 or S208 is performed; the second to-be-synthesized video materials are stored locally.

The uploading operation may be understood as an operation of uploading the first target video, such as a triggering operation of displaying the posting interface of the first target video or a triggering operation of posting the first target video. The second to-be-synthesized video materials may be understood as a local video material that the user edits locally and intends to use to produce the first target video. The first time period may be a period required for directly uploading at least one second to-be-synthesized video material (and the editing information of the user) to the cloud end. The second time period may be a period required for locally synthesizing at least one second to-be-synthesized video material into the first target video and uploading the synthesized first target video to the cloud end. The first time period and the second time period may be determined according to, for example, the size of each video material and the network speed at the current moment.

In an embodiment, the electronic device may upload the first target video upon receiving a triggering operation of displaying the posting interface of the first target video. Illustratively, the electronic device displays a second editing interface of the second to-be-synthesized video materials stored locally; the user edits each second to-be-synthesized video material in the second editing interface and triggers a switching control in the second editing interface when the first target video is to be posted after being edited; accordingly, when detecting that the user triggers the switching control in the second editing interface, the electronic device determines that the uploading operation for the first target video is received, switches the current displaying interface from the second editing interface to the posting interface of the first target video, and acquires a first time period required for uploading the editing information of the user and at least one second to-be-synthesized video to the cloud end and a second time period required for locally synthesizing at least one second to-be-synthesized video material into the first target video and uploading the first target video to the cloud end to upload the first target video in an uploading manner with a shorter required time period.

In another embodiment, the electronic device may also upload the second target video upon receiving a triggering operation of posting the first target video. Illustratively, the electronic device displays a second editing interface of the second to-be-synthesized video materials stored locally; the user edits each second to-be-synthesized video material in the second editing interface and triggers a switching control in the second editing interface after editing is completed; when detecting that the user triggers the switching control in the second editing interface, the electronic device determines that the uploading operation for the first target video is received and switches the current displaying interface from the second editing interface to the posting interface of the first target video; thus, the user may edit the posting information of the first target video in the posting interface of the first target video and trigger the posting control in the posting interface after editing is completed; accordingly, when detecting that the user triggers the posting control in the posting interface of the first target video, the electronic device determines that an uploading operation for the first target video is received, acquires a first time period required for uploading the editing information of the user and at least one second to-be-synthesized video to the cloud end and a second time period required for locally synthesizing at least one second to-be-synthesized video material into the first target video and uploading the first target video to the cloud end to upload the first target video in an uploading manner with a shorter required time period, and posts the first target video after the first target video is uploaded.

In S207, when the first time period is shorter than or equal to the second time period, the second to-be-synthesized video materials are uploaded to the cloud end to synthesize the uploaded second to-be-synthesize video materials into the first target video in the cloud end, and S209 is performed.

In S208, when the first time period is longer than the second time period, the second to-be-synthesized video materials are synthesized into the first target video, and the first target video is uploaded to the cloud end.

An example is used where the uploading operation is used as a triggering operation on the posting control in the posting interface of the first target video. After acquiring the first time period and the second time period, the electronic device may determine the relative size of the first time period and the second time period. When the first time period is shorter than or equal to the second time period, the electronic device may upload each second to-be-synthesized video material to the cloud end and request the cloud end to synthesize at least one second to-be-synthesized video material into the first target video (that is, uploading first and then synthesizing) and post the first target video. When the first time period is longer than the second time period, the electronic device may synthesize at least one second to-be-synthesized video material into the first target video locally, upload the synthesized first target video to the cloud end, and request the cloud end to post the first target video (that is, synthesizing first and then uploading).

When the method of uploading first and then synthesizing includes multiple sub-upload methods (such as multipart upload and multi-threaded upload), a sub-upload method with the shortest required time period may be used for uploading each second to-be-synthesized video material, and accordingly, the first time period is a period required by the sub-upload method with the shortest required time among the multiple sub-upload methods. When the method of first synthesizing and then uploading includes multiple sub-upload methods (such as uploading while synthesizing, synthesizing and uploading after compression, and synthesizing and uploading after fragmentation), the first target video may be synthesized and uploaded by using a sub-upload method with the shortest required time, and accordingly, the second time period is a period required by the sub-upload method with the shortest required time among the multiple sub-upload methods.

In this embodiment, the user may also edit the local second to-be-synthesized video material locally, and after the editing is completed, upload the second target video to the cloud end. Accordingly, when detecting the user's uploading operation, the electronic device may upload the first target video in an uploading manner with the shortest required time period, thereby reducing the time required for uploading.

In S209, a first editing interface of a first target video is displayed, and first editing information of performing, in the first editing interface, a first editing operation on the first target video by a user is acquired; the first target video is stored in the cloud end.

In S210, a first triggering operation on a switching control in the first editing interface is received.

In S211, a posting interface is displayed in response to the first triggering operation.

In S212, a second triggering operation on a posting control in the posting interface is received.

In S213, the first editing information is sent to the cloud end in response to the second triggering operation to synthesize the first target video into a second target video in the cloud end according to the first editing information and to post the second target video.

In an embodiment, synthesizing the to-be-synthesized video materials selected by the user into the first target video includes the steps described below. A second editing interface of the to-be-synthesized video materials selected by the user is displayed. The second editing information of performing, in the second editing interface, a second editing operation on the to-be-synthesized video materials by the user is acquired. The second editing information is sent to the cloud end to synthesize the to-be-synthesized video materials into the first target video in the cloud end according to the second editing information.

Figure 6:
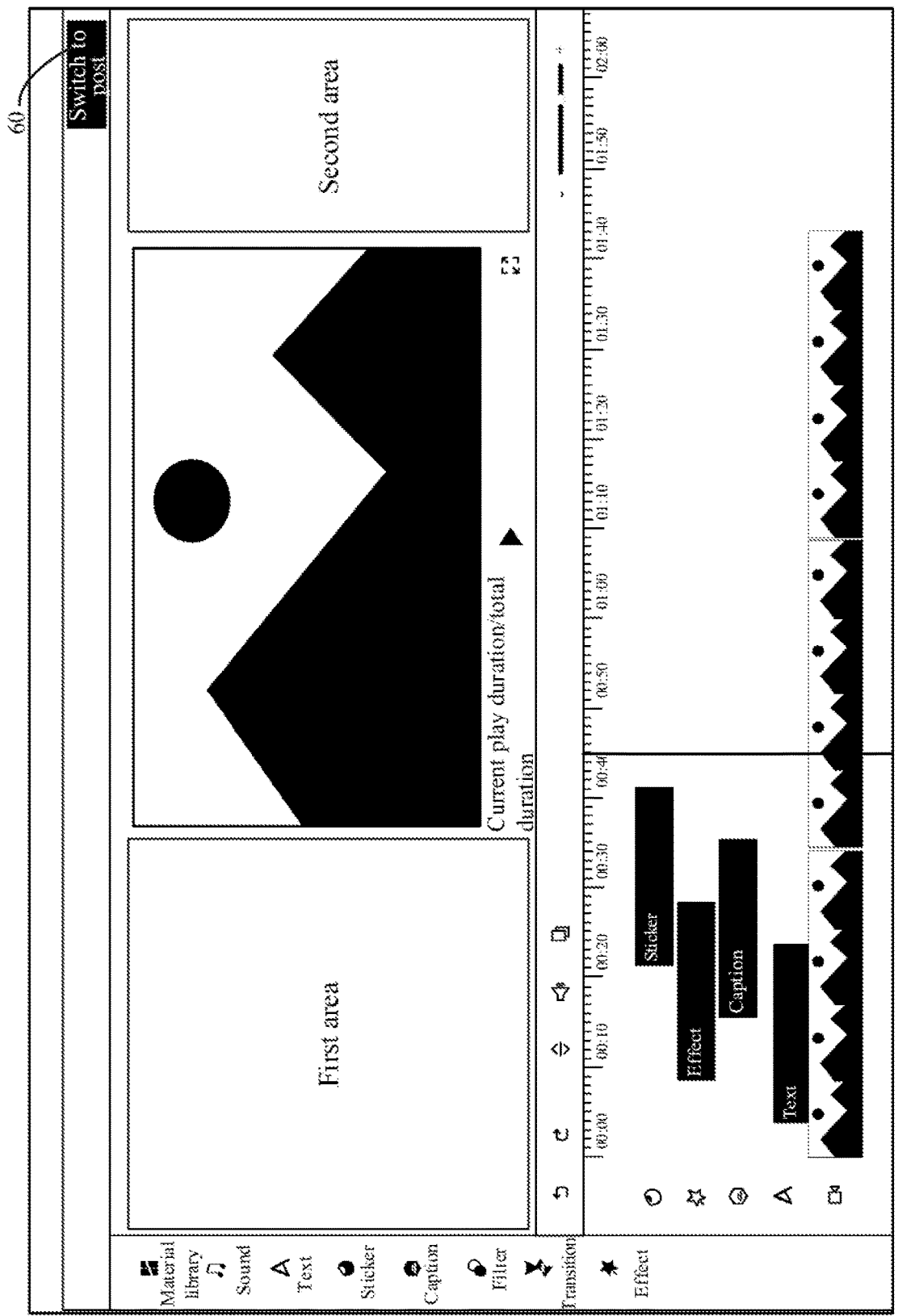
FIG. 6 is a diagram illustrating a second editing interface according to an embodiment of the present disclosure.

The second editing interface may be an interface for the user to select and edit the to-be-synthesized video materials (including the first to-be-synthesized video materials and/or the second to-be-synthesized video materials) required for generating the first target video. As shown in FIG. 6, the contents displayed in multiple areas of the second editing interface and the functions of multiple controls are similar to those of the first editing interface, and details are not described herein. The second editing operation may be an editing operation performed by the user on each to-be-synthesized video material in the second editing interface. The second editing information may be the second editing operation information performed by the user in the second editing interface.

In the aforementioned embodiments, the electronic device may synthesize the first target video at the cloud end. As shown in FIG. 6, the electronic device displays the second editing interface of the to-be-synthesized video material. Thus, the user may edit the to-be-synthesized video materials in the editing interface and trigger a switching control 60 in the second editing interface after the editing is completed. Accordingly, the electronic device records the second editing information of performing, in the second editing interface, the second editing operation on each to-be-synthesized video material by the user. When the electronic device detects that the user triggers the switching control 60 in the second editing interface, the electronic device displays the posting interface of the first target video, as shown in FIG. 3. When the user intends to post the first target video, the user may trigger the posting control 32 in the posting interface of the first target video. When the electronic device detects that the user triggers the posting control 32 in the posting interface of the first target video, the electronic device may send the second editing information to the cloud end to synthesize the to-be-synthesized video materials into the first target video material in the cloud end according to the second editing information and post the first target video.

In another embodiment, synthesizing the to-be-synthesized video materials selected by the user into the first target video includes the steps described below. A second editing interface of the to-be-synthesized video materials selected by the user is displayed. The second editing information of performing, in the second editing interface, a second editing operation on the to-be-synthesized video materials by the user is acquired. The to-be-synthesized video materials are synthesized into the first target video according to the second editing information.

In the aforementioned embodiments, the electronic device may synthesize the first target video. As shown in FIG. 6, the electronic device displays the second editing interface of the to-be-synthesized video material. Thus, the user may edit the to-be-synthesized video materials in the editing interface and trigger a switching control 60 in the second editing interface after the editing is completed. Accordingly, the electronic device records the second editing information of performing, in the second editing interface, the second editing operation on each to-be-synthesized video material by the user. When the electronic device detects that the user triggers the switching control 60 in the second editing interface, the electronic device displays the posting interface of the first target video, as shown in FIG. 3. When the user intends to post the first target video, the user may trigger the posting control 32 in the posting interface of the first target video. When the electronic device detects that the user triggers the posting control 32 in the posting interface of the first target video, the electronic device may synthesize the to-be-synthesized video materials into the first target video according to the second editing information and send the first target video to the cloud end to post the first target video in the cloud end.

Figure 7:
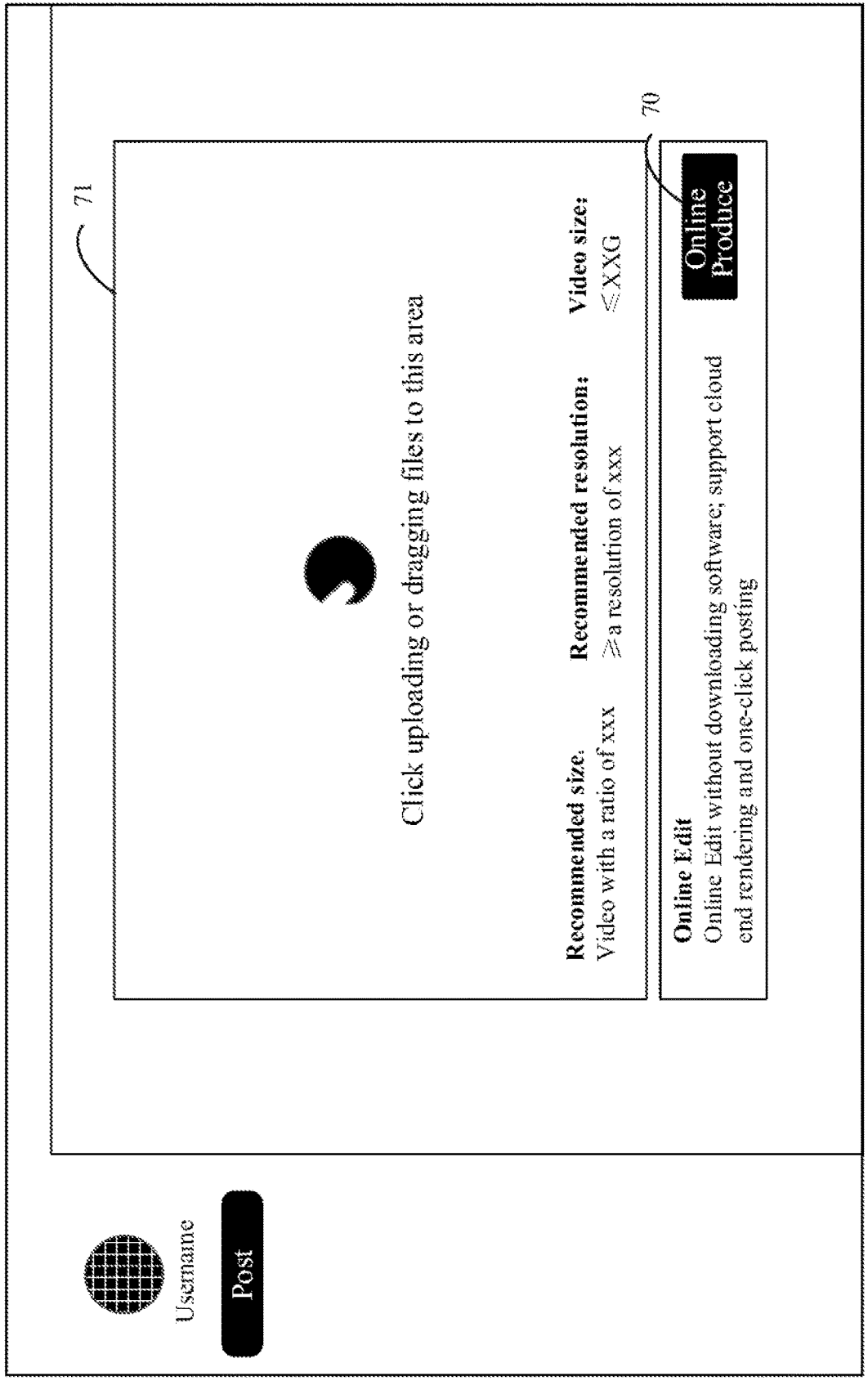
FIG. 7 is a diagram illustrating an uploading interface according to an embodiment of the present disclosure.

In an exemplary scenario, the user may generate a video online based on one or more video materials stored locally and/or in the cloud end. Illustratively, as shown in FIG. 7, the electronic device displays an uploading interface. The user may trigger an online producing control 70 in the uploading interface when intending to synthesize a video online based on video materials stored locally and/or in the cloud end. The electronic device switches the current displaying interface from the uploading interface to the second editing interface when detecting that the user triggers the online producing control 70, as shown in FIG. 6; thus, the user may import and/or select to-be-synthesized video materials in the second editing interface, edit the to-be-synthesized video material, and trigger the switching control 60 in the second editing interface after the editing is completed. When detecting that the user triggers the switching control 60 in the second editing interface, the electronic device switches the current displaying interface from the second editing interface to the posting interface of the first target video, as shown in FIG. 3. Then, the user may edit the posting information of the first target video in the posting interface, instruct the electronic device to switch the current displaying interface back to the second editing interface by triggering the first online modifying control 310 in the first modification mode selection window 31 of the posting interface, instruct the electronic device to request the cloud end to post the first target video by triggering the posting control 32 in the posting interface, and instruct the electronic device to switch out of the posting interface by triggering the switching control of other interfaces or closing control in the posting interface. Accordingly, when detecting that the user triggers the first online modifying control 310, the electronic device may switch the current displaying interface from the posting interface of the first target video to the second editing interface. When detecting that the user triggers the posting control 32 in the posting interface of the first target video, the electronic device sends the second editing information of the user in the second editing interface to the cloud end to synthesize at least one to-be-synthesized video material into the first target video in the cloud end according to the second editing information and post the first target video. When detecting that the user triggers the switching control or the closing control in the posting interface of the first target video, the electronic device performs a corresponding interface switch operation or closes the posting interface of the first target video and may send the second editing information of the user in the second editing interface to the cloud end to synthesize at least one to-be-synthesized video material into the first target video in the cloud end according to the second editing information and store the first target video.

In another exemplary scenario, the user may upload a local video to the cloud end for editing and/or posting. Illustratively, as shown in FIG. 7, the electronic device displays an uploading interface. The user may drag the video or video material to an upload area 71 or click the upload area 71 to select the local video or video material when intending to upload a local video or video material. When detecting the user's drag operation or selection operation, the electronic device uses the video or video material dragged or selected by the user as a first target video, uploads the first target video to the cloud end, and switches the current displaying interface from the uploading interface to the posting interface of the first target video, as shown in FIG. 3. Thus, the user may edit the post information of the first target video in the posting interface, and when the first target video is to be posted, trigger the posting control 32 in the posting interface of the first target video. Accordingly, the electronic device may request the cloud end to post the first target video when detecting that the user triggers the posting control 32 in the posting interface of the first target video. Alternatively, when intending to edit the first target video, the user may instruct the electronic device to switch the current displaying interface from the posting interface to the first editing interface of the first target video by triggering the first online modifying control 310 in the first modification mode selection window 31 of the posting interface of the first target video, as shown in FIG. 2; the user edits the first target video in the first editing interface and triggers the switching control 23 in the first editing interface after the editing is completed. When detecting that the user triggers the first online modifying control 310, the electronic device may switch the current displaying interface from the posting interface of the first target video to the first editing interface, and when detecting that the user triggers the switching control 23 in the first editing interface, the electronic device switches the current displaying interface from the first editing interface to the posting interface of the second target video. The user may edit the post information of the second target video in the posting interface of the second target video and trigger the posting control in the posting interface of the second target video after the editing is completed. Accordingly, when detecting that the user triggers the posting control in the posting interface of the second target video, the electronic device may send the first editing information of the user in the first editing interface to the cloud end to synthesize the first target video into a second target video in the cloud end according to the first editing information and to post the second target video.

In another exemplary scenario, the user may edit a video locally. Illustratively, the user edits the local to-be-synthesized video material locally, and after the editing is completed, instructs the electronic device to display the posting interface of the first target video by a corresponding triggering operation. Accordingly, when detecting that the triggering operation of the posting interface of the first target video is displayed, the electronic device may display the posting interface of the first target video, as shown in FIG. 3, acquire the time period required for each upload method to upload the first target video, and select the upload method with the shortest required time to upload and synthesize (synthesizing first and then uploading or uploading first and then synthesizing) the first target video, and when detecting that the user triggers the posting control 32 in the posting interface of the first target video, the electronic device requests the cloud end to post the first target video. Alternatively, when detecting that the triggering operation of the posting interface of the first target video is displayed, the electronic device displays the posting interface of the first target video, and when detecting that the user triggers the posting control 32 in the posting interface of the first target video, the electronic device acquires the time period required for each upload method to upload the first target video, selects the upload method with the shortest required time to upload and synthesize (synthesizing first and then uploading or uploading first and then synthesizing) the first target video, and requests the cloud end to post the first target video.

In this embodiment, the electronic device may edit each to-be-synthesized video material online based on the triggering operation of the user and synthesize at least one to-be-synthesized video material into a first target video for post when the first target video is to be posted; the electronic device may also edit and clip a video online based on the user's triggering operation, and after the editing is completed, select the upload method with the shortest required time to upload and synthesize the first target video and post the first target video. In this manner, the waiting time of producing and posting videos is reduced, and user experience is improved.

Figure 8:
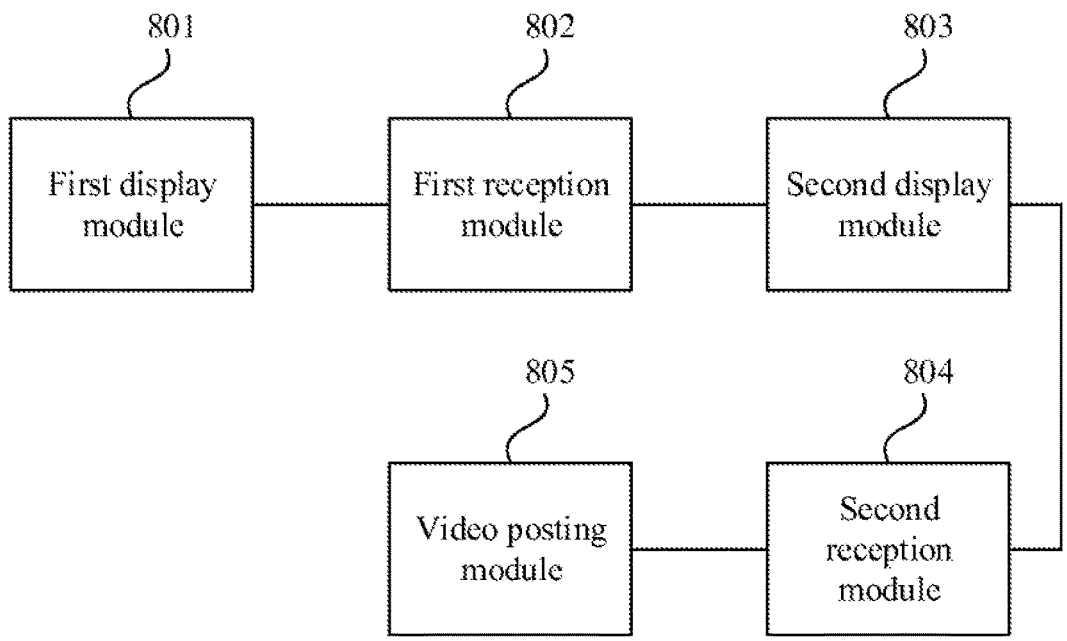
FIG. 8 is a structural block diagram of a video processing apparatus according to an embodiment of the present disclosure.

FIG. 8 is a structural block diagram of a video processing apparatus according to an embodiment of the present disclosure. The apparatus may be implemented by software and/or hardware and may be configured in an electronic device such as a mobile phone or a tablet computer. A video may be processed by executing a video processing method. As shown in FIG. 8, the video processing device provided in this embodiment may include a first display module 801, a first reception module 802, a second display module 803, a second reception module 804, and a video posting module 805.

The first display module 801 is configured to display a first editing interface of a first target video and acquire the first editing information of performing, in the first editing interface, a first editing operation on the first target video by a user. The first target video is stored in the cloud end. The first reception module 802 is configured to receive a first triggering operation on a switching control in the first editing interface. The second display module 803 is configured to display a posting interface in response to the first triggering operation. The second reception module 804 is configured to receive a second triggering operation on a posting control in the posting interface. The video posting module 805 is configured to send the first editing information to the cloud end in response to the second triggering operation to synthesize the first target video into a second target video in the cloud end according to the first editing information and to post the second target video.

In the video processing apparatus according to this embodiment, a first editing interface of a first target video stored in the cloud end is displayed via the first display module 801; the first editing information of performing, in the first editing interface, a first editing operation on the first target video by a user is acquired; the first reception module 802 receives a first triggering operation on a switching control in the first editing interface is received; the second display module 803 displays a posting interface in response to the first triggering operation; the second reception module 804 receives a second triggering operation on a posting control in the posting interface; the video posting module 805 sends the first editing information to the cloud end in response to the second triggering operation to synthesize the first target video into a second target video in the cloud end according to the first editing information and to post the second target video. In this embodiment, the aforementioned technical solution is adopted so that the user is supported to perform cloud editing on the uploaded first target video, and when the operation of the user posting the second target video is received, the first target video is synthesized into the second target video in the cloud end. Thus, the user does not need to download the first target video locally for editing, neither wait for the synthesis of the second target video, or upload the synthesized second target video again, which simplifies operations required for the user to modify the video in the cloud end and reduces the waiting time of users.

The video processing apparatus provided in this embodiment may also include a video synthesis module. The video synthesis module is configured to synthesize to-be-synthesized video materials selected by the user into the first target video before the first editing interface of the first target video is displayed. The to-be-synthesized video materials include first to-be-synthesized video materials and/or second to-be-synthesized video materials. The first to-be-synthesized video materials are stored in the cloud end. The second to-be-synthesized video materials are stored locally.

In the aforementioned solutions, the video synthesis module may include a first reception unit and a first synthesis unit. The first reception unit is configured to receive a posting operation for the first target video. The first synthesis unit is configured to request the cloud end to synthesize the to-be-synthesized video materials selected by the user into the first target video and to post the first target video in response to the posting operation.

In the aforementioned solutions, the video synthesis module may include a second reception unit and a second synthesis unit. The second reception unit is configured to receive a saving operation for the first target video. The second synthesis unit is configured to request the cloud end to synthesize the to-be-synthesized video materials selected by the user into the first target video and to save the first target video in response to the saving operation.

In the aforementioned solutions, the to-be-synthesized video materials may include the second to-be-synthesized video materials, and the video synthesis module may include a third reception unit, a time acquisition unit, a first upload unit, and a second upload unit. The third reception unit is configured to receive an uploading operation for the first target video. The time acquisition unit is configured to, in response to the uploading operation, acquire a first time period required for uploading the second to-be-synthesized video materials selected by the user to the cloud end and a second time period required for synthesizing the second to-be-synthesized video materials selected by the user into the first target video and uploading the first target video to the cloud end. The first upload unit is configured to, when the first time period is shorter than or equal to the second time period, upload the second to-be-synthesized video materials to the cloud end to synthesize the uploaded second to-be-synthesize video materials into the first target video in the cloud end. The second upload unit is configured to, when the first time period is longer than the second time period, synthesize the second to-be-synthesized video materials into the first target video and upload the first target video to the cloud end.

In the aforementioned solutions, the video synthesis module may be configured to display a second editing interface of the to-be-synthesized video materials selected by the user, acquire the second editing information of performing, in the second editing interface, a second editing operation on the to-be-synthesized video materials by the user, and send the second editing information to the cloud end to synthesize the to-be-synthesized video materials into the first target video in the cloud end according to the second editing information.

In the aforementioned solutions, the video synthesis module may be configured to display a second editing interface of the to-be-synthesized video materials selected by the user, acquire the second editing information of performing, in the second editing interface, a second editing operation on the to-be-synthesized video materials by the user, and synthesize the to-be-synthesized video materials into the first target video according to the second editing information.

The video processing apparatus according to this embodiment of the present disclosure may execute the video processing method according to any embodiment of the present disclosure and has corresponding functional modules and effects for executing the video processing method. For technical details not described in detail in this embodiment, reference may be made to the video processing method according to any embodiment of the present disclosure.

Figure 9:
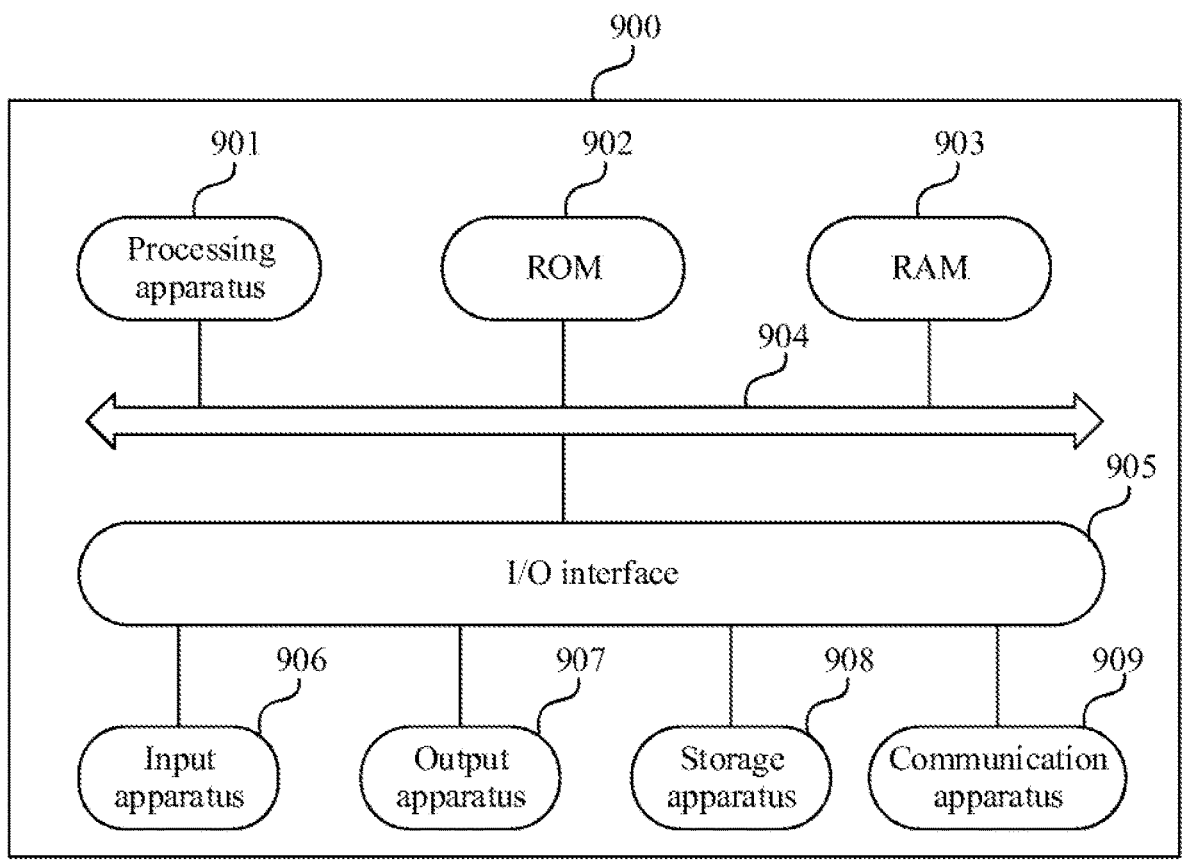
FIG. 9 is a structural block diagram of an electronic device according to an embodiment of the present disclosure.

With reference to FIG. 9, FIG. 9 shows a structural block diagram of an electronic device 900 (such as a terminal device) applicable to implementing embodiments of the present disclosure. The terminal device in embodiments of the present disclosure may include but is not limited to, a mobile terminal such as a mobile phone, a laptop, a digital broadcast receiver, a personal digital assistant (PDA), a PAD, a portable media player (PMP), and a vehicle-mounted terminal (for example, a vehicle-mounted navigation terminal) and a fixed terminal such as a digital TV, and a desktop computer. The electronic device shown in FIG. 9 is merely an example and should not impose any limitation on the function and usage scope of embodiments of the present disclosure.

As shown in FIG. 9, the electronic device 900 may include a processing apparatus 901 (such as a central processing unit or a graphics processor). The processing apparatus 901 may perform various appropriate actions and processing according to a program stored in a read-only memory (ROM) 902 or a program loaded into a random-access memory (RAM) 903 from a storage apparatus 908. The RAM 903 also stores various programs and data required for the operation of the electronic device 900. The processing apparatus 901, the ROM 902, and the RAM 903 are connected to each other through a bus 904. An input/output (I/O) interface 905 is also connected to the bus 904.

Generally, the following apparatus may be connected to the I/O interface 905: an input apparatus 906 such as a touch screen, a touch pad, a keyboard, a mouse, a camera, a microphone, an accelerometer, and a gyroscope; an output apparatus 907 such as a liquid crystal display (LCD), a speaker, and a vibrator; a storage apparatus 908 such as a magnetic tape and a hard disk; and a communication apparatus 909. The communication apparatus 909 may allow the electronic device 900 to perform wireless or wired communication with other devices to exchange data. FIG. 9 shows the electronic device 900 having various apparatuses, but it is not necessary to implement or be equipped with all the shown apparatuses. Alternatively, the electronic device 900 may implement or be equipped with more or fewer apparatuses.

According to embodiments of the present disclosure, the process described above with reference to the flowchart may be implemented as a computer software program. For example, embodiments of the present disclosure include a computer program product. The computer program product includes a computer program carried in a non-transitory computer-readable medium. The computer program includes program codes for performing the method shown in the flowchart. In such an embodiment, the computer program may be downloaded and installed from the network via the communication apparatus 909, or may be installed from the storage apparatus 908, or may be installed from the ROM 902. When the computer program is executed by the processing apparatus 901, the aforementioned functions defined in the methods of the embodiments of the present disclosure are performed.

The aforementioned computer-readable medium of the present disclosure may be a computer-readable signal medium, a computer-readable storage medium, or any combination of the computer-readable signal medium and the computer-readable storage medium. The computer-readable storage medium may be, but is not limited to, an electrical, magnetic, optical, electromagnetic, infrared, or semiconductor system, apparatus, or device, or any combination thereof. Examples of the computer-readable storage medium may include, but are not limited to, an electrical connection with one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a base band or as a part of a carrier wave. Computer-readable program codes are carried in the data signal. Such propagated data signals may take a variety of forms, including, but not limited to, electromagnetic signals, optical signals, or any suitable combination thereof.

The computer-readable signal medium may also be any computer-readable medium other than a computer-readable storage medium. The computer-readable signal medium may send, propagate, or transmit a program used by or in conjunction with an instruction execution system, apparatus, or device. The program codes contained on the computer-readable medium may be transmitted on any suitable medium, including, but not limited to, a wire, an optical cable, radio frequency (RF), or any suitable combination thereof.

In some embodiments, the client and the server may communicate by using any currently known or future-developed network protocol such as HyperText Transfer Protocol (HTTP) and may be interconnected by any form or medium of digital data communication (for example, a communication network). Examples of the communication network include a local area network (LAN), a wide area network (WAN), an interconnected network (for example, the Internet), an end-to-end network (for example, an ad hoc end-to-end network), and any currently known or future-developed network.

The aforementioned computer-readable medium may be included in the aforementioned electronic device or may exist alone without being assembled into the electronic device.

The aforementioned computer-readable medium carries one or more programs. When executing the one or more programs, the electronic device performs the steps described below. A first editing interface of a first target video is displayed; the first editing information of performing, in the first editing interface, a first editing operation on the first target video by a user is acquired, and the first target video is stored in the cloud end; a first triggering operation on a switching control in the first editing interface is received; a posting interface is displayed in response to the first triggering operation; a second triggering operation on a posting control in the posting interface is received; and the first editing information is sent to the cloud end in response to the second triggering operation to synthesize the first target video into a second target video in the cloud end according to the first editing information and to post the second target video.

Computer program codes for performing the operations in the present disclosure may be written in one or more programming languages or a combination thereof. The aforementioned one or more programming languages include but are not limited to object-oriented programming languages such as Java, Smalltalk, and C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to a user computer via any kind of network including a LAN or a WAN, or may be connected to an external computer (for example, via the Internet by an Internet service provider).

The flowcharts and block diagrams in the drawings show possible architectures, functions, and operations of the system, method, and computer program product according to the multiple embodiments of the present disclosure. In this regard, each block in the flowcharts or block diagrams may represent a module, a program segment, or part of codes that include one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block of the block diagrams and/or flowcharts and combinations of blocks in the block diagrams and/or flowcharts may be implemented by not only a specific-purpose hardware-based system that performs a specified function or action, but also a combination of specific-purpose hardware and computer instructions.

The described units involved in the embodiments of the present disclosure may be implemented by software or hardware. The name of a module is not intended to limit the unit in a certain circumstance.

The functions described herein above may be performed at least in part by one or more hardware logic components. For example, without limitation, exemplary types of hardware logic components that may be used include Field Programmable Gate Array (FPGA), Application Specific Integrated Circuit (ASIC), Application Specific Standard Product (ASSP), System on Chips (SOC), and Complex Programmable Logical device (CPLD).

In the context of the present disclosure, a machine-readable medium may be a tangible medium that may contain or store a computer program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Examples of the machine-readable storage medium may include an electrical connection bused on one or more wires, a portable computer disk, a hard disk, a RAM, a ROM, an EPROM or flash memory, an optical fiber, a CD-ROM, an optical storage device, a magnetic storage device, or any appropriate combination thereof.

According to one or more embodiments of the present disclosure, example 1 provides a video processing method. The method includes the steps below.

A first editing interface of a first target video is displayed, and the first editing information of performing, in the first editing interface, a first editing operation on the first target video by a user is acquired. The first target video is stored in the cloud end.

A first triggering operation on a switching control in the first editing interface is received.

A posting interface is displayed in response to the first triggering operation.

A second triggering operation on a posting control in the posting interface is received.

The first editing information is sent to the cloud end in response to the second triggering operation to synthesize the first target video into a second target video in the cloud end according to the first editing information and to post the second target video.

According to one or more embodiments of the present disclosure, example 2 also includes the steps below according to the method described in example 1 before displaying the first editing interface of the first target video.

To-be-synthesized video materials selected by the user are synthesized into the first target video. The to-be-synthesized video materials include first to-be-synthesized video materials and/or second to-be-synthesized video materials. The first to-be-synthesized video materials are stored in the cloud end. The second to-be-synthesized video materials are stored locally.

According to one or more embodiments of the present disclosure, synthesizing the to-be-synthesized video materials selected by the user into the first target video in example 3 includes the steps below according to the method described in example 2.

A posting operation for the first target video is received.

In response to the posting operation, the cloud end is requested to synthesize the to-be-synthesized video materials selected by the user into the first target video and to post the first target video.

According to one or more embodiments of the present disclosure, synthesizing the to-be-synthesized video materials selected by the user into the first target video in example 4 includes the steps below according to the method described in example 2.

A saving operation for the first target video is received.

In response to the saving operation, the cloud end is requested to synthesize the to-be-synthesized video materials selected by the user into the first target video and to save the first target video.

According to one or more embodiments of the present disclosure, the to-be-synthesized video materials include the second to-be-synthesized video materials, and synthesizing the to-be-synthesized video materials selected by the user into the first target video in example 5 also includes the steps below according to the method described in example 2.

An uploading operation for the first target video is received.

In response to the uploading operation, a first time period required for uploading the second to-be-synthesized video materials selected by the user to the cloud end is required, and a second time period required for synthesizing the second to-be-synthesized video materials selected by the user into the first target video and uploading the first target video to the cloud end is required.

When the first time period is shorter than or equal to the second time period, the second to-be-synthesized video materials are uploaded to the cloud end to synthesize the uploaded second to-be-synthesize video materials into the first target video in the cloud end.

When the first time period is longer than the second time period, the second to-be-synthesized video materials are synthesized into the first target video, and the first target video is uploaded to the cloud end.

According to one or more embodiments of the present disclosure, synthesizing the to-be-synthesized video materials selected by the user into the first target video in example 6 includes the steps below according to the method described in example 2.

A second editing interface of the to-be-synthesized video materials selected by the user is displayed, and second editing information of performing, in the second editing interface, a second editing operation on the to-be-synthesized video materials by the user is acquired.

The second editing information is sent to the cloud end to synthesize the to-be-synthesized video materials into the first target video in the cloud end according to the second editing information.

According to one or more embodiments of the present disclosure, synthesizing the to-be-synthesized video materials selected by the user into the first target video in example 7 includes the steps below according to the method described in example 2.

A second editing interface of the to-be-synthesized video materials selected by the user is displayed, and second editing information of performing, in the second editing interface, a second editing operation on the to-be-synthesized video materials by the user is acquired.

The to-be-synthesized video materials are synthesized into the first target video according to the second editing information.

According to one or more embodiments of the present disclosure, example 8 provides a video processing apparatus. The apparatus includes a first display module, a first reception module, a second display module, a second reception module, and a video posting module.

The first display module is configured to display a first editing interface of a first target video and acquire the first editing information of performing, in the first editing interface, a first editing operation on the first target video by a user. The first target video is stored in the cloud end.

The first reception module is configured to receive a first triggering operation on a switching control in the first editing interface.

The second display module is configured to display a posting interface in response to the first triggering operation.

The second reception module is configured to receive a second triggering operation on a posting control in the posting interface.

The video posting module is configured to send the first editing information to the cloud end in response to the second triggering operation to synthesize the first target video into a second target video in the cloud end according to the first editing information and to post the second target video.

According to one or more embodiments of the present disclosure, example 9 provides an electronic device. The electronic device includes one or more processors and a memory.

The memory is configured to store one or more programs.

When executed by the one or more processors, the one or more programs cause the one or more processors to perform the video processing method of any one of examples 1 to 7.

According to one or more embodiments of the present disclosure, example 10 provides a computer-readable storage medium storing a computer program. The computer program, when executed by a processor, performs the video processing method of any one of examples 1 to 7.

Additionally, although multiple operations are described in a particular order, it is not a must to perform these operations in this particular order or in sequential order. In a certain environment, multitasking and parallel processing may be advantageous. Similarly, although multiple implementation details are included in the aforementioned discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable sub-combination.

What is claimed is:

1. A video processing method, comprising:
    displaying a first editing interface of a first target video, and acquiring first editing information of performing a first editing operation on the first target video, in the first editing interface, wherein the first target video is stored in cloud end;
    receiving a first triggering operation on a switching control in the first editing interface;
    in response to the first triggering operation on the switching control, switching the first editing interface to a posting interface;
    receiving a second triggering operation on a posting control in the posting interface; and
    sending the first editing information to the cloud end and requesting the cloud end to synthesize the first target video into a second target video according to the first editing information and to post the second target video.

2. The method according to claim 1, wherein before displaying the first editing interface of the first target video, the method further comprises:
    synthesizing a to-be-synthesized video materials selected by the user into the first target video, wherein the to-be-synthesized video materials comprises at least one of first to-be-synthesized video materials or second to-be-synthesized video materials, the first to-be-synthesized video materials are stored in the cloud end, and the second to-be-synthesized video materials are stored locally.

3. The method according to claim 2, wherein synthesizing the to-be-synthesized video materials selected by the user into the first target video comprises:
    receiving a posting operation for the first target video; and
    in response to the posting operation, requesting the cloud end to synthesize the to-be-synthesized video materials selected by the user into the first target video and to post the first target video.

4. The method according to claim 2, wherein synthesizing the to-be-synthesized video materials selected by the user into the first target video comprises:
    receiving a saving operation for the first target video; and in response to the saving operation, requesting the cloud end to synthesize the to-be-synthesized video materials selected by the user into the first target video and to save the first target video.

5. The method according to claim 2, wherein the to-be-synthesized video materials comprises the second to-be-synthesized video materials, and synthesizing the to-be-synthesized video materials selected by the user into the first target video comprises:
receiving an uploading operation for the first target video;
in response to the uploading operation, acquiring a first time period required for uploading the second to-be-synthesized video materials selected by the user to the cloud end, and acquiring a second time period required for synthesizing the second to-be-synthesized video materials selected by the user into the first target video and uploading the first target video to the cloud end; and
when the first time period is shorter than or equal to the second time period, uploading the second to-be-synthesized video materials to the cloud end to synthesize the uploaded second to-be-synthesize video materials into the first target video in the cloud end; or, when the first time period is longer than the second time period, synthesizing the second to-be-synthesized video materials into the first target video, and uploading the first target video to the cloud end.

6. The method according to claim 2, wherein synthesizing the to-be-synthesized video materials selected by the user into the first target video comprises:
displaying a second editing interface of the to-be-synthesized video materials selected by the user, and acquiring second editing information of performing, in the second editing interface, a second editing operation on the to-be-synthesized video materials by the user; and
sending the second editing information to the cloud end to synthesize the to-be-synthesized video materials into the first target video in the cloud end according to the second editing information.

7. The method according to claim 2, wherein synthesizing the to-be-synthesized video materials selected by the user into the first target video comprises:
displaying a second editing interface of the to-be-synthesized video materials selected by the user, and acquiring second editing information of performing, in the second editing interface, a second editing operation on the to-be-synthesized video materials by the user; and
synthesizing the to-be-synthesized video materials into the first target video according to the second editing information.

8. An electronic device, comprising:
at least one processor; and
a memory configured to store at least one program;
wherein when executed by the at least one processor, the at least one program cause the at least one processor to perform:
displaying a first editing interface of a first target video, and acquiring first editing information of performing a first editing operation on the first target video in the first editing interface, wherein the first target video is stored in cloud end;
receiving a first triggering operation on a switching control in the first editing interface;
in response to the first triggering operation on the switching control, switching the first editing interface to a posting interface;
receiving a second triggering operation on a posting control in the posting interface; and
in response to the second triggering operation on the posting control, sending the first editing information to the cloud end and requesting the cloud end to synthesize the first target video into a second target video according to the first editing information and to post the second target video.

9. The electronic device according to claim 8, wherein when executed by the at least one processor, the at least one program cause the at least one processor to perform:
synthesizing a to-be-synthesized video materials selected by the user into the first target video, wherein the to-be-synthesized video materials comprises at least one of first to-be-synthesized video materials or second to-be-synthesized video materials, the first to-be-synthesized video materials are stored in the cloud end, and the second to-be-synthesized video materials are stored locally.

10. The electronic device according to claim 9, wherein when executed by the at least one processor, the at least one program cause the at least one processor to perform:
receiving a posting operation for the first target video; and
in response to the posting operation, requesting the cloud end to synthesize the to-be-synthesized video materials selected by the user into the first target video and to post the first target video.

11. The electronic device according to claim 9, wherein when executed by the at least one processor, the at least one program cause the at least one processor to perform:
receiving a saving operation for the first target video; and
in response to the saving operation, requesting the cloud end to synthesize the to-be-synthesized video materials selected by the user into the first target video and to save the first target video.

12. The electronic device according to claim 9, wherein the to-be-synthesized video materials comprises the second to-be-synthesized video materials, and wherein when executed by the at least one processor, the at least one program cause the at least one processor to perform:
receiving an uploading operation for the first target video;
in response to the uploading operation, acquiring a first time period required for uploading the second to-be-synthesized video materials selected by the user to the cloud end, and acquiring a second time period required for synthesizing the second to-be-synthesized video materials selected by the user into the first target video and uploading the first target video to the cloud end; and
when the first time period is shorter than or equal to the second time period, uploading the second to-be-synthesized video materials to the cloud end to synthesize the uploaded second to-be-synthesize video materials into the first target video in the cloud end; or, when the first time period is longer than the second time period, synthesizing the second to-be-synthesized video materials into the first target video, and uploading the first target video to the cloud end.

13. The electronic device according to claim 9, wherein when executed by the at least one processor, the at least one program cause the at least one processor to perform:
displaying a second editing interface of the to-be-synthesized video materials selected by the user, and acquiring second editing information of performing, in the second editing interface, a second editing operation on the to-be-synthesized video materials by the user; and sending the second editing information to the cloud end to synthesize the to-be-synthesized video materials into the first target video in the cloud end according to the second editing information.

14. The electronic device according to claim 9, wherein when executed by the at least one processor, the at least one program cause the at least one processor to perform:

displaying a second editing interface of the to-be-synthesized video materials selected by the user, and acquiring second editing information of performing, in the second editing interface, a second editing operation on the to-be-synthesized video materials by the user; and synthesizing the to-be-synthesized video materials into the first target video according to the second editing information.

15. A non-transitory computer-readable storage medium storing a computer program which, when executed by a processor, performs:

displaying a first editing interface of a first target video, and acquiring first editing information of performing a first editing operation on the first target video in the first editing interface, wherein the first target video is stored in cloud end;

receiving a first triggering operation on a switching control in the first editing interface;

in response to the first triggering operation on the switching control, switching the first editing interface to a posting interface;

receiving a second triggering operation on a posting control in the posting interface; and in response to the second triggering operation on the posting control, sending the first editing information to the cloud end and requesting the cloud end to synthesize the first target video into a second target video according to the first editing information and to post the second target video.

16. The storage medium according to claim 15, wherein the computer program, when executed by a processor, performs:

synthesizing a to-be-synthesized video materials selected by the user into the first target video, wherein the to-be-synthesized video materials comprises at least one of first to-be-synthesized video materials or second to-be-synthesized video materials, the first to-be-synthesized video materials are stored in the cloud end, and the second to-be-synthesized video materials are stored locally.

17. The storage medium according to claim 16, wherein the computer program, when executed by a processor, performs:

receiving a posting operation for the first target video; and in response to the posting operation, requesting the cloud end to synthesize the to-be-synthesized video materials selected by the user into the first target video and to post the first target video.

18. The storage medium according to claim 16, wherein the computer program, when executed by a processor, performs:

receiving a saving operation for the first target video; and in response to the saving operation, requesting the cloud end to synthesize the to-be-synthesized video materials selected by the user into the first target video and to save the first target video.

19. The storage medium according to claim 16, wherein the to-be-synthesized video materials comprises the second to-be-synthesized video materials, and wherein the computer program, when executed by a processor, performs:

receiving an uploading operation for the first target video;

in response to the uploading operation, acquiring a first time period required for uploading the second to-be-synthesized video materials selected by the user to the cloud end, and acquiring a second time period required for synthesizing the second to-be-synthesized video materials selected by the user into the first target video and uploading the first target video to the cloud end; and when the first time period is shorter than or equal to the second time period, uploading the second to-be-synthesized video materials to the cloud end to synthesize the uploaded second to-be-synthesize video materials into the first target video in the cloud end; or, when the first time period is longer than the second time period, synthesizing the second to-be-synthesized video materials into the first target video, and uploading the first target video to the cloud end.

20. The storage medium according to claim 16, wherein the computer program, when executed by a processor, performs:

displaying a second editing interface of the to-be-synthesized video materials selected by the user, and acquiring second editing information of performing, in the second editing interface, a second editing operation on the to-be-synthesized video materials by the user; and sending the second editing information to the cloud end to synthesize the to-be-synthesized video materials into the first target video in the cloud end according to the second editing information.

* * * * *